Aug. 22, 1933.  A. J. BOYNTON ET AL  1,923,138
METHOD AND APPARATUS FOR CONTINUOUS FILTERING
Filed Nov. 24, 1931     2 Sheets-Sheet 1
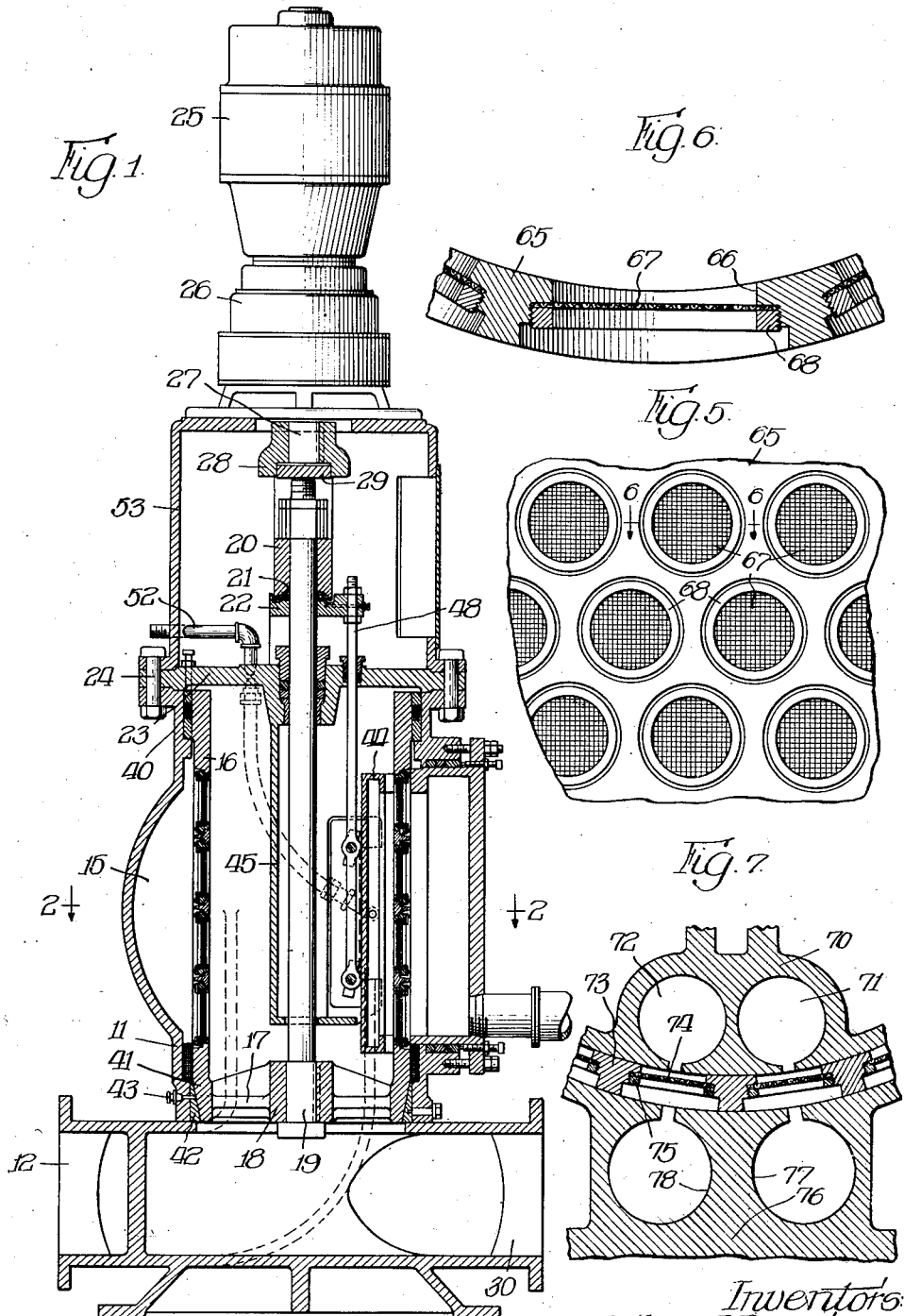
Inventors:
Arthur J. Boynton,
Frank A. DeLisle, Aug. 22, 1933.  A. J. BOYNTON ET AL  1,923,138
METHOD AND APPARATUS FOR CONTINUOUS FILTERING
Filed Nov. 24, 1931  2 Sheets-Sheet 2
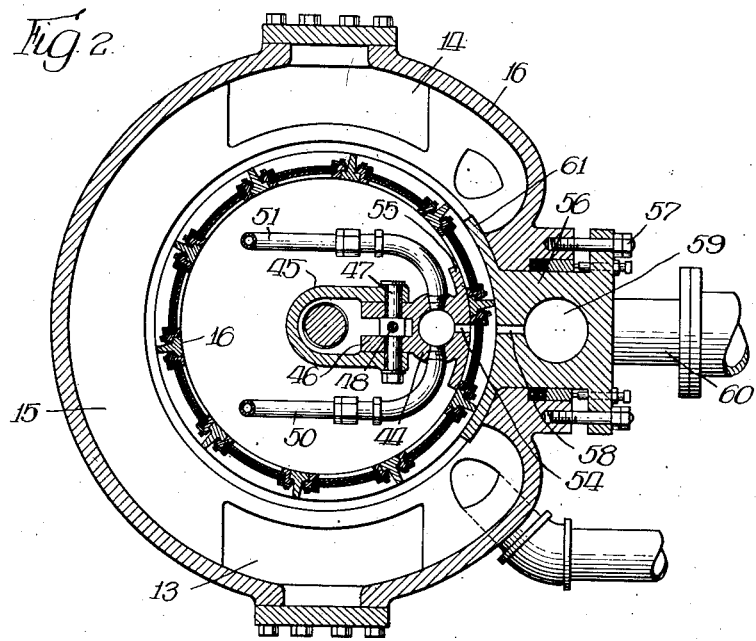
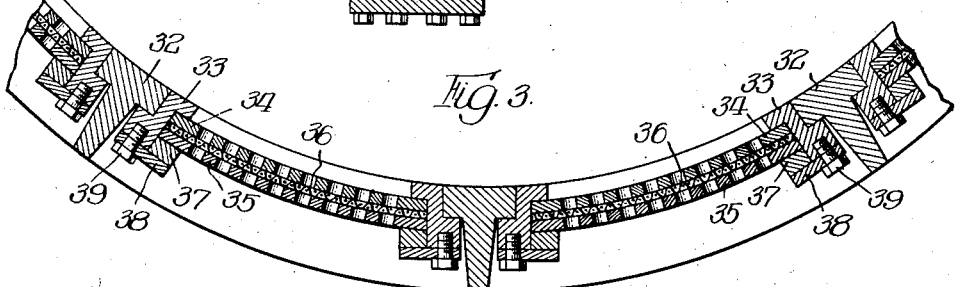
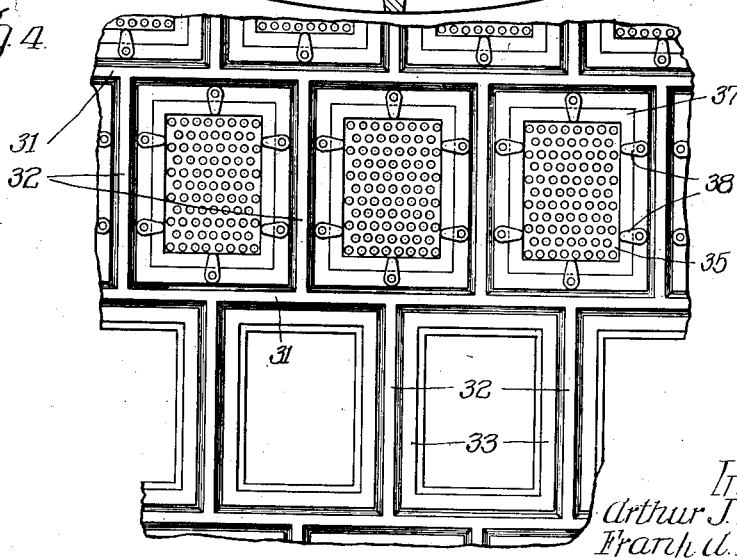
Inventors:
Arthur J. Boynton,
Frank W. DeLisle,
By Wilkinson Huxley Byron & Knight attys.

Patented Aug. 22, 1933

1,923,138

UNITED STATES PATENT OFFICE 1,923,138

METHOD AND APPARATUS FOR CONTINUOUS FILTERING

Arthur J. Boynton, Chicago, Ill., and Frank A. De Lisle, New York, N. Y., assignors to H. A. Brassert & Company, Chicago, Ill., a Corporation of Illinois Application November 24, 1931
Serial No. 576,968

7 Claims. (Cl. 210—152)

This invention relates to a new and improved method and apparatus for continuous screening or filtering, and more particularly to a method and apparatus whereby a rotating filter or screen element is cleaned by a continuous backwash of a changing portion of the filter or screen. This backwashing may be accomplished by the return of a portion of the filtered fluid through the screen or by a separate backwash flow under pressure. This high pressure flow may be of water, steam or of any chemical liquid or gaseous cleaning fluids or mixtures.

Heretofore filters of this character have been constructed so that the revolving element was composed of three parts, an outer perforated cylinder, an inner perforated cylinder and an intermediate filter cloth. The outer surface of the outer cylinder and the inner surface of the inner cylinder have been machine finished so as to permit their rotation about the central vertical axis while maintaining close contact with the housings used for introducing and removing the backwash.

Under certain circumstances, and particularly when the filter is of fine mesh, the construction described above is open to objections on account of difficulty in fitting and supporting the filter cloth, and also in preventing leakage of water from one phase of the filtering process into another.

An extremely fine filter cloth is also comparatively fragile and consequently requires to be changed from time to time as a result of punctures. Where the previously described construction is employed, a change of a large section of the filter cloth is made necessary whenever a puncture, however minute, occurs.

It is an object of the present invention to provide a new and improved filter structure and method of filtering.

It is also an object to provide a construction in which the filter screen is carried by the rotating filter element in the form of small, individually removable sections.

It is an additional object to provide a construction adapted to prevent leakage from one phase of the filtering process to another.

It is a further object to provide a construction in which the inner and outer peripheries of the screen cylinder are concentric so that tightness may be maintained between the cylinder and the backwash discharging and receiving headers without excessive pressure.

It is also an object to provide a construction of this character in which the filter units are so arranged that a continuous flow is maintained between the backwash discharging and receiving headers.

It is an additional object to provide a construction permitting successive backwashing with the same or different reagents.

Other and further objects will appear as the description proceeds.

We have shown certain preferred embodiments of our invention in the accompanying drawings, in which—

Figure 1 is a vertical section, partly in elevation, through one form of construction;

Figure 2 is a horizontal section taken on line 2—2 of Figure 1;

Figure 3 is an enlarged horizontal section of a fragment of the screen supporting structure shown in Figure 2;

Figure 4 is a face view, on a reduced scale, of the construction shown in Figure 3;

Figure 5 is a view similar to Figure 4, but showing a modified form of construction;

Figure 6 is a fragmentary section taken on line 6—6 of Figure 5 and shown on an enlarged scale; and Figure 7 is a fragmentary horizontal section showing a modified form of double backwashing construction.

Referring first to the form of construction shown in Figures 1 to 4, the filter body 11 is provided with a fluid inlet connection 12 for the fluid to be treated, this connection 12 dividing into two upwardly extending portions 13 and 14 which discharge into the chamber 15. This chamber substantially surrounds the rotating filter assembly which is generally designated by the reference character 16. This assembly 16 comprises a cylindrical framework which is supported by the spider 17 having the hub 18 keyed to the rotating shaft 19. This shaft 19 is provided at its upper end with a collar 20 which rests on a bearing 21 carried by a member 22, which member is supported from the cover plate 23. This cover plate is secured to the top of the housing 11 by means of bolts 24.

The shaft 19 is rotated by means of the motor 25 through a reduction gear 26, which latter drives the shaft 27 and the clutch member 28 engaging the clutch member 29 carried by the upper end of the shaft 19. The lower end of the filter screen assembly 16 is open save for the spider 17, and the screened fluid is discharged through this lower end and out through the offtake 30.

The screen frame construction is best shown in Figures 3 and 4 and consists of horizontal flanges 31 and vertical flanges 32 which define rectangular openings. Each opening carries a rectangular frame 33 tightly fitted therein, and the frame 33 carries perforated plates 34 and 35 between which the filter screen 36 is held. These plates and screen are held in place by an outer frame 37 which is clamped by the lugs 38 held by screws 39. It will be noted that the vertical flanges are offset laterally in successive rows so that any vertical section will always include screened openings.

It will be apparent from Figure 1 that the upper and lower portions of the rotating filter frame 16 are solid, the upper portion making contact with the bearing 40 and the lower portion 41 making contact with the bearing 42. This lower portion 41 is shown as tapering and has a close, fluid-tight wedge fit with the tapering bearing 42, which may be provided with lubrication through the lubricators 43.

The backwash header 44 is carried by the U-shaped flange 45 which depends from the cover plate 23 and which is best shown in Figure 2. The header 44 is provided with the rearwardly extending flanges 46 which are connected to the member 45 by the cross bars 47. The vertical rod 48 supports this header from the member 22 and makes it possible to adjust the header without opening the filter casing proper. The header is connected by means of the flexible pipes or tubes 50 and 51 to the fixed pipes 52, which lead from the cover plate 23 through the upper housing 53. These pipes 52 may be connected to any suitable source of backwashing fluid, whether gaseous or liquid.

As shown in Figure 2, the header 44 has a narrow discharge slot 54 and a wide arcuate face having the laterally extending flanges 55. The total width of the face and flanges 55 is such that at no time will any portion of a screened opening which is receiving backwashing fluid through the slot 54, be in communication with the interior of the rotating frame. The backwash receiving header 56 is adjustably clamped to the housing 16 by bolts 57. This header has a narrow slot 58 opposite the slot 54 in the header 44, and the slot 58 communicates with the fluid and solid matter receiving cavity 59. The backwashed material passes from the header 56 through the pipe 60. The header 56 is also provided with lateral flanges 61 which are of such an extent that at no time can any of the backwash fluid pass directly from the slot 54 through any opening in the rotating frame into the chamber 15 which holds the liquid to be filtered.

The construction shown in Figures 5 and 6 differs from that just described in that the rotating screen frame 65 is provided with a plurality of circular openings 66 which have screens 67 clamped in place by the rings 68 which are threaded into the openings. It will be understood that if the screen 67 is of such a degree of fineness as to require their support, perforated plates may be placed on either side of the screen and clamped in place by the rings 68 in a manner similar to that shown in Figure 3. These circular openings 66 may be of any size, however, and may be so proportioned as to afford an opening such that the screen 67 to be used, is adequately supported without additional elements. It will be noted that these circular openings are offset in alternate rows in a manner similar to the rectangular openings of Figure 4.

In some cases it may be desirable to perform a double backwashing operation and in Figure 7 we have shown a construction having a backwash header 70 provided with two separated cavities 71 and 72. A rotating frame is shown at 73 having the small screen section 74 secured therein by the threaded ring 75. The backwash discharge receiving header 76 is provided with the receiving chamber 77 opposite the chamber 71 and the second receiving chamber 78 opposite the receiving chamber 72.

It will be understood that the construction shown in Figure 7 may be applied to the general assembly shown in Figure 1 without other alteration therein than the substitution of the double headers and receiving chambers for the single one shown in Figures 1 and 2. By the use of the construction shown in Figure 7 it is possible to give a double washing with the same or different fluids. For example, steam might be used in chambers 71 and 77 and water in the chambers 72 and 78, or any other desired combination of backwashing fluids may be used. A primary backwashing may be with a chemical reagent and a secondary washing with water, steam, compressed air or other washing or cleaning medium.

The purpose of the alternative constructions shown, with rectangular panels or a plain casting with circular openings is to provide for varying amounts of solids in the water. If this amount is so great that the removed solids more than fill the available space between the screen and the surface line of the cylinder during the periods between backwashing, the panel construction is to be preferred. If the solids in suspension are less in volume and capable of being confined within the available space as shown in Figure 5, then the plain cylinder is preferable as being simpler and cheaper.

Another feature of this invention is the length of the flanges 55 and 61 on washout header and washout outlet respectively as shown in Figure 2. The length of these flanges is determined by the distance between screen sections both inside and outside, the flanges being of a minimum length sufficient to extend from one section to another as the filter casting revolves to bring a section opposite the slot 54. The amount of unfiltered liquid which can pass to the outlet port is therefore limited by the volume of the space bounded by the section flanges, the screen or filter and the flanges of the outlet port casting.

Any vertical line from top to bottom of the filter casting or frame as shown in Figures 4 or 5, will always pass through filter or screen units. The arrangement is such that as the filter casting revolves, the slot 54 of the backwashing header 44 and the slot 58 of the washout casting 56 of Figure 2 are always opposed by portions of filter units open to the backwashing flow. In this way excess pressure against the filter units is avoided. The invention consists in arranging the filter units so that they overlap when considered with reference to any vertical line on the surface of the filter casting. The filter units may be circular or rectangular or of any other desired form.

While we have shown certain preferred embodiments of our invention and described certain methods of carrying out the filtering operation, it is to be understood that both structure and method are capable of modification to meet varying conditions and requirements. The specific disclosure therefore, is to be understood as illustrative only as we contemplate such changes and modifications as come within the spirit and scope of the appended claims.

We claim:

1. In a revolving filter adapted to be cleaned by backwashing, a rotating filter member comprising a frame with spaced openings formed therein, separate filter elements carried by the frame and closing said openings, backwash discharging and receiving members adjacent opposite sides of the rotating filter member and flanges on said backwash members extending adjacent the rotating surfaces, such flanges being greater in lateral extent than the lateral width of the spaced openings in the rotating filter member.

2. In a revolving filter adapted to be cleaned by backwashing, a rotating filter member, a plurality of backwash discharging members adjacent one side of the filter member, a similar number of backwash receiving members on the opposite side of the filter member and in registration with the backwash discharging members, and flanges carried by the backwash members adjacent the filter member to direct flow from each backwash discharge member into the corresponding backwash receiving member, said flanges being continuous between adjacent backwash members.

3. In a revolving filter adapted to be cleaned by backwashing, a rotating filter member carrying filtering media, a backwashing passage, the rotating member having recesses carrying sections of filtering media, the recesses being adapted to carry solid matter filtered from the fluid past the backwashing passage, the backwashing passage being formed with flanges closely engaging the face of the rotating member, the recesses and flanges being so related in size that when any recess is in communication with the backwashing passage it is closed off by the flanges from the flow of liquid being filtered.

4. In a revolving filter adapted to be cleaned by backwashing, a rotating filter member comprising a frame with spaced openings formed therein, separate filter elements carried by the frame and closing said openings, a backwash receiving member adjacent a face of the rotating filter member, and flanges on said backwash receiving member extending adjacent the rotating surfaces, such flanges being greater in lateral extent than the lateral width of the spaced openings in the rotating filter member.

5. In a revolving filter adapted to be cleaned by backwashing, a rotating filter member having spaced openings formed therein, separate filter elements fitted in said openings and located below the level of the outer face of the rotating member forming pockets, a backwash receiving member located adjacent said outer face of the rotating member, and flanges on said backwash receiving member extending adjacent the rotating surfaces, such flanges being greater in lateral extent than the lateral width of the spaced openings in the rotating filter member.

6. In a revolving filter adapted to be cleaned by backwashing, a rotating filter member having spaced openings formed therein, said openings being spaced both axially and circumferentially of the rotating member and in staggered relation circumferentially of the member, separate filter elements fitted in said openings and located below the level of the outer face of the rotating member forming pockets, a backwash receiving member located adjacent said outer face of the rotating member, and flanges on said backwash receiving member extending adjacent the rotating surfaces, such flanges being greater in lateral extent than the lateral width of the spaced openings in the rotating filter member.

7. In a revolving filter adapted to be cleaned by backwashing, a rotating filter member having spaced circular openings formed therein, separate filter elements fitted in said openings and held below the level of the outer face of the rotating member forming pockets by frames threaded into the circular openings, a backwash receiving member located adjacent said outer face of the rotating member, and flanges on said backwash receiving member extending adjacent the rotating surfaces, such flanges being greater in lateral extent than the lateral width of the spaced openings in the rotating filter member.

ARTHUR J. BOYNTON.
FRANK A. DE LISLE.